United States Patent [19]

Zhu

[11] Patent Number: 4,961,988

[45] Date of Patent: Oct. 9, 1990

[54] GENERAL PACKING OF EXPANDED GRAPHITE

[75] Inventor: Di Xiang Zhu, Zhejiang, China

[73] Assignee: Zhejiang CI XI Seal Material Factory, Zhejiang, China

[21] Appl. No.: 249,981

[22] Filed: Sep. 27, 1988

[30] Foreign Application Priority Data

Sep. 28, 1987 [CN] China .................................. 87106668

[51] Int. Cl.$^5$ ................................................ D03D 3/00
[52] U.S. Cl. ...................................... 428/229; 252/502; 252/511; 423/448; 423/460; 428/224; 428/225; 428/408
[58] Field of Search ............... 428/408, 225, 229, 224; 252/502, 511; 423/448, 460

[56] References Cited

FOREIGN PATENT DOCUMENTS 57-29854 2/1982 Japan .

Primary Examiner—James J. Bell
Attorney, Agent, or Firm—Michael N. Meller

[57] ABSTRACT

This invention relates to a general packing of expanded graphite and the process for production thereof. The packing mainly includes vermiform laminae of expanded graphite and auxiliary materials, which is characterized by the embedment of the auxiliary materials into the vermiform graphite laminae, the bonding of the auxiliary materials to the vermiform graphite laminae with organic adhesives. The process for producing of the packing comprises the treatment of graphite with strong acid to produce interlaminar compound followed by transient expansion of treated graphite to become vermiform and the combination of vermiform graphite laminae with the auxiliary materials to produce packing. Wherein the above mentioned vermiform laminae of expanded graphite are bonded to the auxiliary materials with organic adhesives, and the auxiliary materials are embedded between the vermiform laminae of expanded graphite.

22 Claims, No Drawings

GENERAL PACKING OF EXPANDED GRAPHITE

FIELD OF THE INVENTION

This invention relates to a sealing material for fluid media, more particularly to a general graphite packing and the process for production thereof.

BACKGROUND

A method for production of composite woven shaped packing of expanded graphite was disclosed in the Japanese patent No. 57-29854. In this prior art, natural scaly graphite, newly formed graphite and heat-dissociated graphite were used as raw materials and were treated with strong acid to form interlaminar compound, washed with water, and then expanded momentarily at high temperature. The resulting expanded graphite granules were pressed into expanded shape graphite. A tubular fabric was used as auxiliary material, which had been formed by check braiding covering braiding or sack knitted of asbestos or carbon fibers from bottom to top. The expanded shape graphite thus produced were rolled up into cylindrical form or cut into band with definite width, or cut into scraps or slices to fill up the cavity of the tubular fabrics, forming the composite packing. Since this kind of composite packing was completely made from derivatives of carbon, the resistance to heat, corrosion and abrasion were improved. Nevertheless, the mechanical strength of the products was not high enough to undergo flexure since the material of the fabric layer is different from that of the filling substance in the packing and the expanded graphite slices (scraps) were combined mainly by mechanical force. Furthermore, as there was no adhesion between the tubular fabric and the shape graphite, the damage to the fabric will result in failure of the packing, leading to inconvenience for application. Moreover, the durability of the products was not adequate under high pressure condition, and its availability was not extensive.

In view of this, one of the objectives of the invention is to provide a sort of general packing of expanded graphite with high strength. The other objective of the invention is to provide a process for producing the said packing.

SUMMARY OF THE INVENTION

The invention relates to a general packing of expanded graphite including mainly the vermiform laminae of expanded graphite and auxiliary matarial, characterized in that the said auxiliary materials are embedded into the vermiform laminae of expanded graphite, and bonded to each other with organic adhesives.

This invention also relates to a process for production of the general packing of expanded graphite, which comprises the treatment of the graphite with strong acid to form interlaminar compound, transient expansion of treated graphite at high temperature to become vermiform and combining with the auxiliary materials to form packing. The characteristic lies in the vermiform laminae is bonded with the auxiliary materials by organic adhesives, and the auxiliary materials are embedded in the vermiform laminae of the expanded graphite.

DESCRIPTION OF THE PREFERRED EMBODIMENTS

The invention is illustrated in detail by the following examples. However, the examples are merely presented to conbritute to comprehension and embodiment of the invention, not intended to confine the present invention.

EXAMPLE 1.

Preparation of the expanded graphite strip

General packing of expanded graphite in this invention is produced by using natural scaly graphite or graphite powder as raw material, which are treated with strong acid, such as concentrated hydrochloric acid, to form interlaminar compound, then washed with water to remove acid and dried, finally, subjected to transient expansion at high temperature to become vermiform graphite laminae. These procedures are conducted according to the known techniques in the prior art.

Besides, the surface of the auxiliary materials are impregnated with organic adhesives, such as in the manner of continuous impregnation or coated with organic adhesives which are useful for both the expanded graphite and the auxiliary materials, selected from nitrile compound, such as butyronitrile or epoxybutyronitrile adhesive, unsaturated hydrocarbon, such as chlorbutadiene or cyano-propylene, polyester, such as polypropionate, or ethylene polyacetate, and epoxyn, more preferably are one or more members of the group consisting of butyronitrile, chlorobutadiene and ethylene polyacetate. Tight adhesion of the expanded graphite to the auxiliary materials is the point regardless the proportion of the adhesives to the auxiliary material. The auxiliary materials may be soft linear, membranous or fabric substance selected from one or more of the following materials: organic synthetic film, glass fibers, natural or synthetic fibers and carbon fibers in thickness of less than 0.2 mm, preferably 0.02–0.06 mm. It is better to use the manner of continuous impregnation for covering with the adhesive, this is, the auxiliary material, such as in shape of membrane is passed through a tank containing adhesive, then properly heated and desicated. The temperature ranges from 20° to 100° C., preferably 50°–100° C., more preferably 70°–80° C.

Thereafter, the above treated auxiliary materials, such as in the shape of membrane, are embedded in the vermiform laminae of the expanded graphite, the amount of the auxiliary materials in the packing is below 10% by weight based on the total weight of the packing. In general, it is desirable to have the auxiliary materials evenly embedded in the expanded graphite laminae (i.e. the thickness of the graphite vermiform laminae adhered to both sides of the auxiliary material is identical). The density of the vermiform graphite is 0.003–0.03 kg/cm$^3$ depending on different applications. The next step is to go through mechanical rolling press under the pressure of 70–150 kg/cm$^2$ (i.e. low pressure is required for the application with large size, and high pressure for small one). The expanded graphite strip thus produced is 0.10–0.30 mm in thickness.

EXAMPLE 2.

Preparation of the general packing roll of expanded graphite.

The graphite strip with expanded graphite as external surfaces and the auxiliary materials embedded in them (see example 1) is rolled up according to the known technique in the prior art, either in single sheet or in multisheet overlapped. One or more layers of metallic wires, such as copper, iron, tin and aluminum wires, are interpolated into the centre, the diameter of which being less than 0.10 mm, preferably 0.05–0.07 mm; cotton and hemp fibers less than 0.10 mm in layer can also be used. Therefore, the internal combining strength and folding endurance of the packing will be enhenced. Then, by extrusion or rolling press for shaping at the pressure of 120–180 kg/cm$^2$, the general packing roll of expanded graphite in required sectional shape and size is produced.

In comparison with the packing produced by previous techniques, the above mentioned one has higher resistance to abrasion and folding, being suitable for sealing of larger sites (openings) and special sites as well.

EXAMPLE 3.

Preparation of rope-like general packing of expanded graphite.

The expanded graphite produced according to Example 1 is cut into narrow strip 5–50 mm in width, preferably 20–30 mm, then twisted into graphite thread. One or more pieces of metallic wires selected from the group consisting of copper, iron, tin and aluminum with diameter less than 0.10 mm may be incorporated while twisting. The sectional size of the packing can be varied by using different number of pieces of thread. The graphite thread is passed through the matched mould mouth for shaping and surface processing. Thus the rope-like general packing of expanded graphite in desired length is obtained.

This kind of packing expanded graphite produced according to above method has superior flexibility, being able to be folded arbitrarily within the scope of 0°–180°, useful for static and dynamic sealing as well as special sealing.

EXAMPLE 4.

Preparation of braided general packing of expanded graphite

According to the process described in Example 3, the rope-like expanded graphite is produced from the expanded graphite strip, obtained by the method of Example 1. The resulting rope-like graphite is hole braided through a braiding machine, such as hole braiding machine or covering braided or multi-braided repeatedly with graphite rope incorporated within. Then after shape-finishing and surface processing, the braided general packing of expanded graphite in different sectional shapes and sizes is obtained.

The packing thus produced has high strength, stable size and can be flexed arbitrarily within 0°–180°, useful for static and dynamic sealing of openings various size, particularly effective for dynamic sealing of the fluid media with relatively high PV value (i.e. high pressure and rotating speed) or containing solid substances.

The prominant feature of the invention is that the external surfaces of the packing are graphite laminae and the auxiliary materials embedded in them may be very thin and even. The amount of the said expanded graphite is more than 90% by weight based on the total weight of the packing, leading to the properties of the packing close to the pure graphite products in superior resistance to high temperature, abrasion and corrosion. Furthermore, it is more superior to pure graphite products and other previous packing in strength, folding endurance; Comparing to original expanded graphite stuffing rings only 75% pretension is required to apply for sealing when setting and the doubled durability at least. On the other hand, the process of this invention can provide general packing with sectional surface in different shape, size and length, so that it can be appropriately applied to fluid static and dynamic sealing of all sizes of openings as well as special mouths. The user may take the packing product of required type and length and wind it on the site to be sealed. Satisfactory sealing can be attained just by pressure applied. This kind of sealing will be most convenient for transportation, storage and setting, and the cost in both production and application is reduced.

The above detailed descriptions of this invention will be of help in comprehension and embodiment of the invention. Obviously, various modifications and changes can be made which are all included in the scope of the Claims attached.

What is claimed is:

1. A general packing of expanded graphite comprising mainly the vermiform laminae of expanded graphite and auxiliary materials characterized by the embedment of said auxiliary material which has previously been impregnated or coated with an organic adhesive into the vermiform graphite laminae, and bonding them to each other with said organic adhesive.

2. The packing of claim 1 characterized in that the said auxiliary material is selected from one or more members of the group consisting of organic synthetic film, glass fibers, synthetic fibers and carbon fibers.

3. The packing of claim 1 characterized in that the said auxiliary materials is in the shape of soft linear, membranous or fabric.

4. The packing of claim 1 characterized in that the thickness of the auxiliary material is less than 0.2 mm, preferably 0.02–0.06 mm.

5. The packing of claim 1 characterized in that the amount of auxiliary materials is less than 10% by weight of the packing.

6. The packing of claim 1 characterized in that the said organic adhesives are selected from nitrile compound, unsaturated hydrocarbon, polyester or epoxyn.

7. The packing of claim 6 characterized in that the said organic adhesives are selected from one or more members of the group consisting of butyronitrile, chlorobutadiene or ethylene polyacetate.

8. The packing of claim 1 characterized in that it may also contain one or more substances selected from the group consisting of cotton fibers, hemp fibers, and wire of copper, iron, tin or aluminum.

9. The packing of claim 8 characterized in that the diameter of copper, iron, tin or aluminum wire is below 0.10 mm, preferably 0.05–0.07 mm.

10. A general packing of expanded graphite characterized in that said packing may be a fabric made of thread which has been twisted from at least one strip of a composite comprising mainly the vermiform laminae of said expanded graphite and an auxiliary material, wherein the auxiliary material is embedded into said vermiform laminae of the expanded graphite with an organic adhesive which has previously been impregnated or coated to the said auxiliary material.

11. The packing of claim 10 characterized in that the strip is 5–50 mm in width.

12. The packing of claim 10 characterized in that the said auxiliary material is selected from one or more members of the group consisting of organic synthetic film, glass fibers, synthetic fibers and carbon fibers.

13. The packing of claim 10 characterized in that the said auxiliary materials are in the shape of soft linear, membranous or fabric.

14. The packing of claim 10 characterized in that the thickness of the auxiliary material is less than 0.2 mm.

15. The packing of claim 10 characterized in that the amount of auxiliary materials is less than 10% by weight of the packing.

16. The packing of claim 10 characterized in that the said organic adhesives are selected from nitrile compounds, unsaturated hydrocarbons, polyesters or epoxyn.

17. The packing of claim 10 characterized in that the said organic adhesives are selected from one or more members of the group consisting of butyronitrile, chlorobutadiene or ethylene polyacetate.

18. The packing of claim 10 characterized in that it may also contain one or more substances selected from the group consisting of cotton fibers, hemp fibers, and wire of copper, iron, tin or aluminum.

19. The packing of claim 18 characterized in that the diameter of copper, iron, tin or aluminum wire is below 0.10 mm.

20. The packing of claim 11 characterized in that the strip is 20-30 mm in width.

21. The packing of claim 14 wherein the thickness of the auxiliary material is between 0.02-0.06 mm.

22. The packing of claim 18 wherein the wire diameter is 0.05-0.07 mm.

* * * * *

REEXAMINATION CERTIFICATE (2151st)

United States Patent [19]

Zhu

[11] B1 4,961,988

[45] Certificate Issued Dec. 14, 1993

[54] GENERAL PACKING OF EXPANDED GRAPHITE

[75] Inventor: Di Xiang Zhu, Zhejiang, China

[73] Assignee: Zhejiang Ci Xi Seal Material Factory, Zhejiang, China

Reexamination Request:
No. 90/002,651, Feb. 21, 1992

Reexamination Certificate for:
Patent No.: 4,961,988
Issued: Oct. 9, 1990
Appl. No.: 249,981
Filed: Sep. 27, 1988

[30] Foreign Application Priority Data

Sep. 28, 1987 [CN] China ............................. 87106668

[51] Int. Cl.$^5$ ............................................. D03D 3/00
[52] U.S. Cl. ................................. 428/229; 252/502; 252/511; 423/448; 423/460; 428/224; 428/225; 428/408
[58] Field of Search ................ 428/224, 225, 229, 408; 252/502, 511; 423/448, 460

[56] References Cited

U.S. PATENT DOCUMENTS

| | | | |
|---|---|---|---|
| 3,404,061 | 4/1963 | Shane et al. | 161/125 |
| 4,455,334 | 5/1982 | Ogino et al. | 428/36 |

FOREIGN PATENT DOCUMENTS

| | | |
|---|---|---|
| 51-12051 | 1/1976 | Japan . |
| 52-92216 | 8/1977 | Japan . |
| 143483 | 12/1984 | Japan . |

*Primary Examiner*—James J. Bell

[57] ABSTRACT

This invention relates to a general packing of expanded graphite and the process for production thereof. The packing mainly includes vermiform laminae of expanded graphite and auxiliary materials, which is characterized by the embedment of the auxiliary materials into the vermiform graphite laminae, the bonding of the auxiliary materials to the vermiform graphite laminae with organic adhesives. The process for producing of the packing comprises the treatment of graphite with strong acid to produce interlaminar compound followed by transient expansion of treated graphite to become vermiform and the combination of vermiform graphite laminae with the auxiliary materials to produce packing. Wherein the above mentioned vermiform laminae of expanded graphite are bonded to the auxiliary materials with organic adhesives, and the auxiliary materials are embedded between the vermiform laminae of expanded graphite.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *